United States Patent [19]

Moyse et al.

[11] 4,325,769
[45] Apr. 20, 1982

[54] METHOD OF MAKING BELLOWS

[76] Inventors: Richard J. Moyse, Sea Coast La., Port Washington, N.Y. 11050; Clarence L. Moyse, 103-88 Monarch Dr., Largo, Fla. 33540

[21] Appl. No.: 111,731

[22] Filed: Jan. 14, 1980

[51] Int. Cl.³ .......................... B23P 19/04; F16J 3/04; G03B 17/04
[52] U.S. Cl. ...................................... 156/217; 29/454; 92/34; 156/226; 156/275.1; 264/163; 354/187
[58] Field of Search ............... 156/217, 218, 219, 273, 156/256, 226, 274; 264/163; 138/121; 29/454; 354/187; 92/34

[56] References Cited

U.S. PATENT DOCUMENTS

| | | | |
|---|---|---|---|
| 2,589,022 | 3/1952 | Page et al. | 264/163 |
| 2,965,961 | 12/1960 | Schindler et al. | 138/121 |
| 3,265,551 | 8/1966 | Ananian et al. | 156/273 |
| 3,336,950 | 8/1967 | Fochler | 138/121 |
| 3,461,531 | 8/1969 | Degain | 29/454 |
| 4,008,651 | 2/1971 | Pain | 156/218 |
| 4,186,779 | 2/1980 | Wagner | 138/121 |

*Primary Examiner*—Jerome W. Massie
*Attorney, Agent, or Firm*—Allison C. Collard; Thomas M. Galgano

[57] ABSTRACT

A method for making an axially extendable and contractable bellows is provided for use in monolayer photographic lithographic cameras and enlargers. The method includes the initial step of passing a single web of synthetic resin sheet material past at least one die having die edges arranged in a predetermined pattern for producing a separable bellows blank having fold lines formed therein for forming of multiplicity of pleats. Then the bellows blank is die formed and following its separation from the web it is folded onto itself to produce a seam which is then bonded. Finally, the hollow body thus formed is compressed along its longitudinal axis and along the fold lines so as to produce a pleated bellows configuration.

8 Claims, 10 Drawing Figures

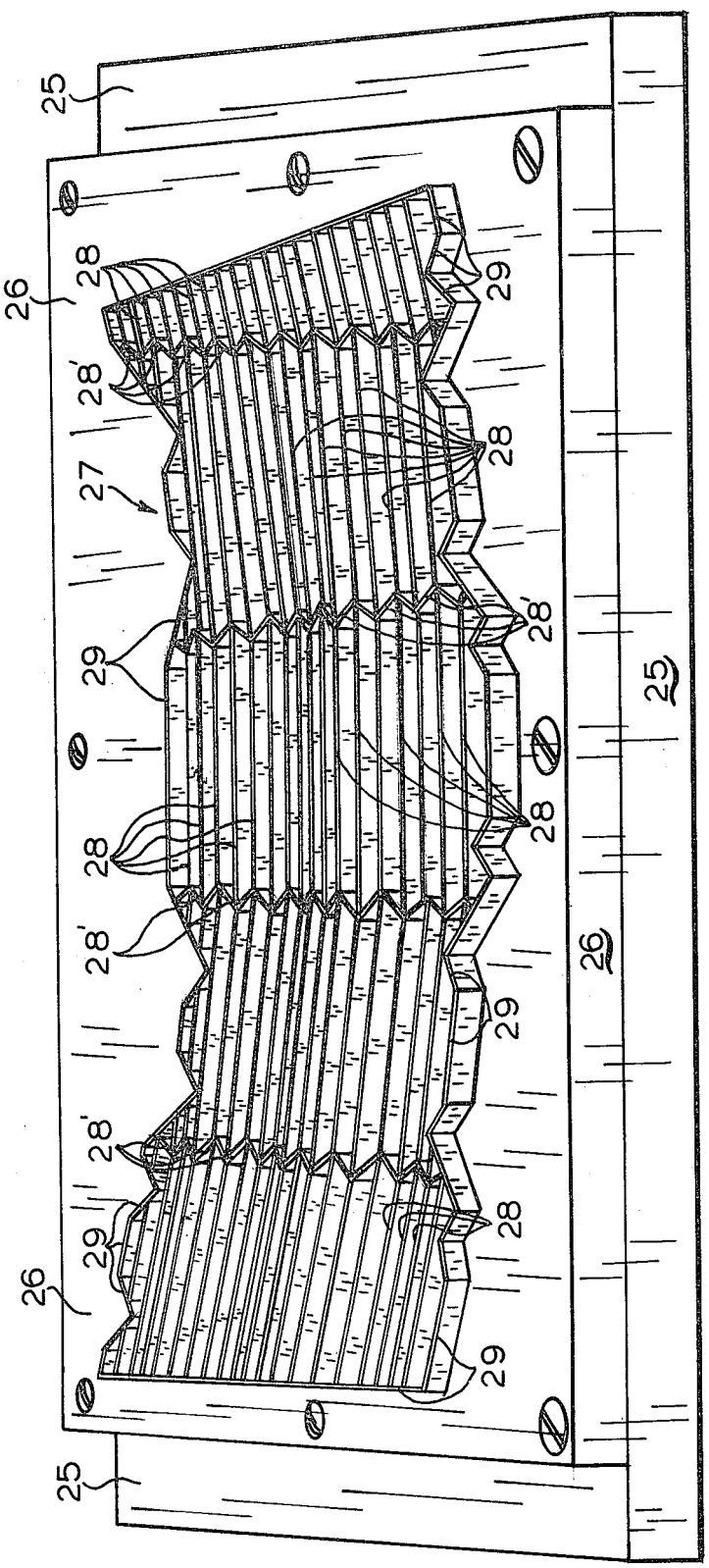
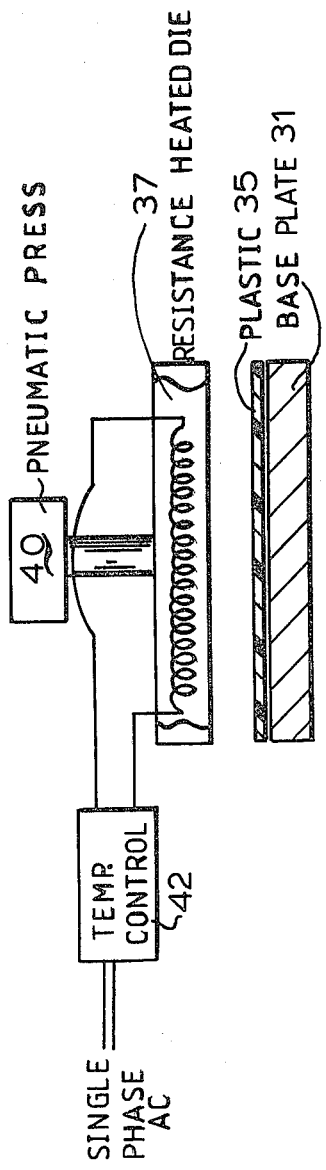

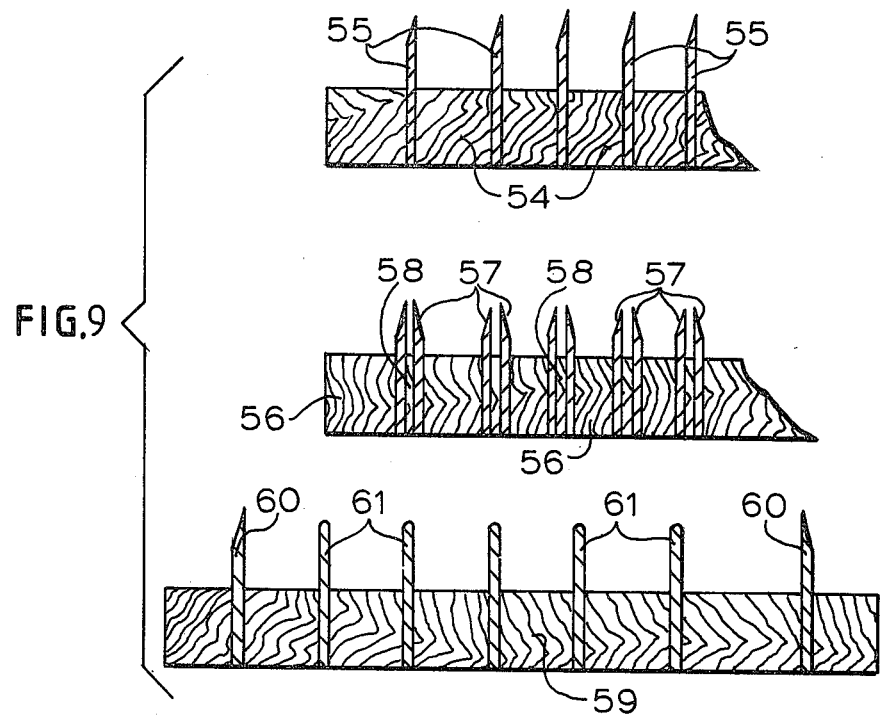
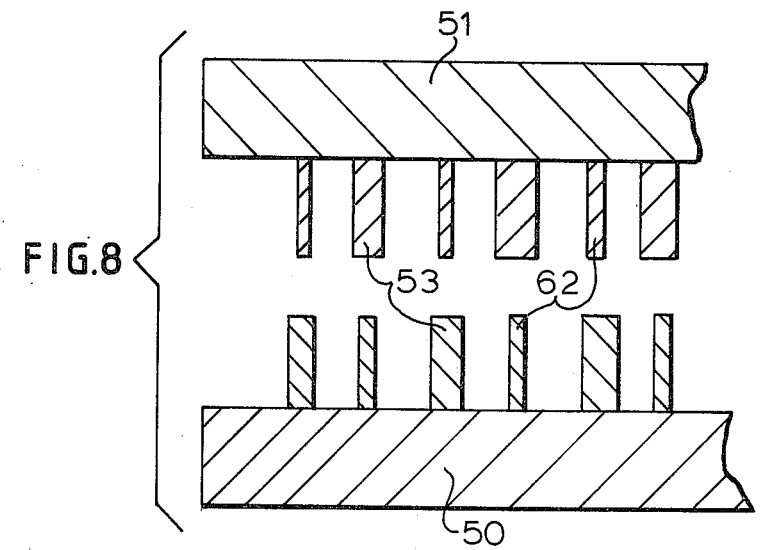
FIG.7
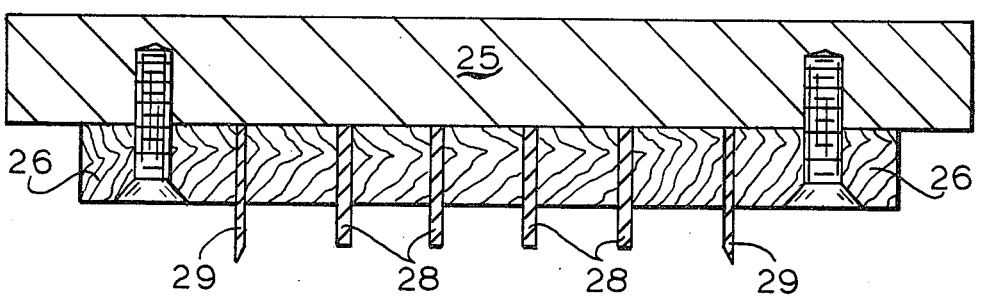

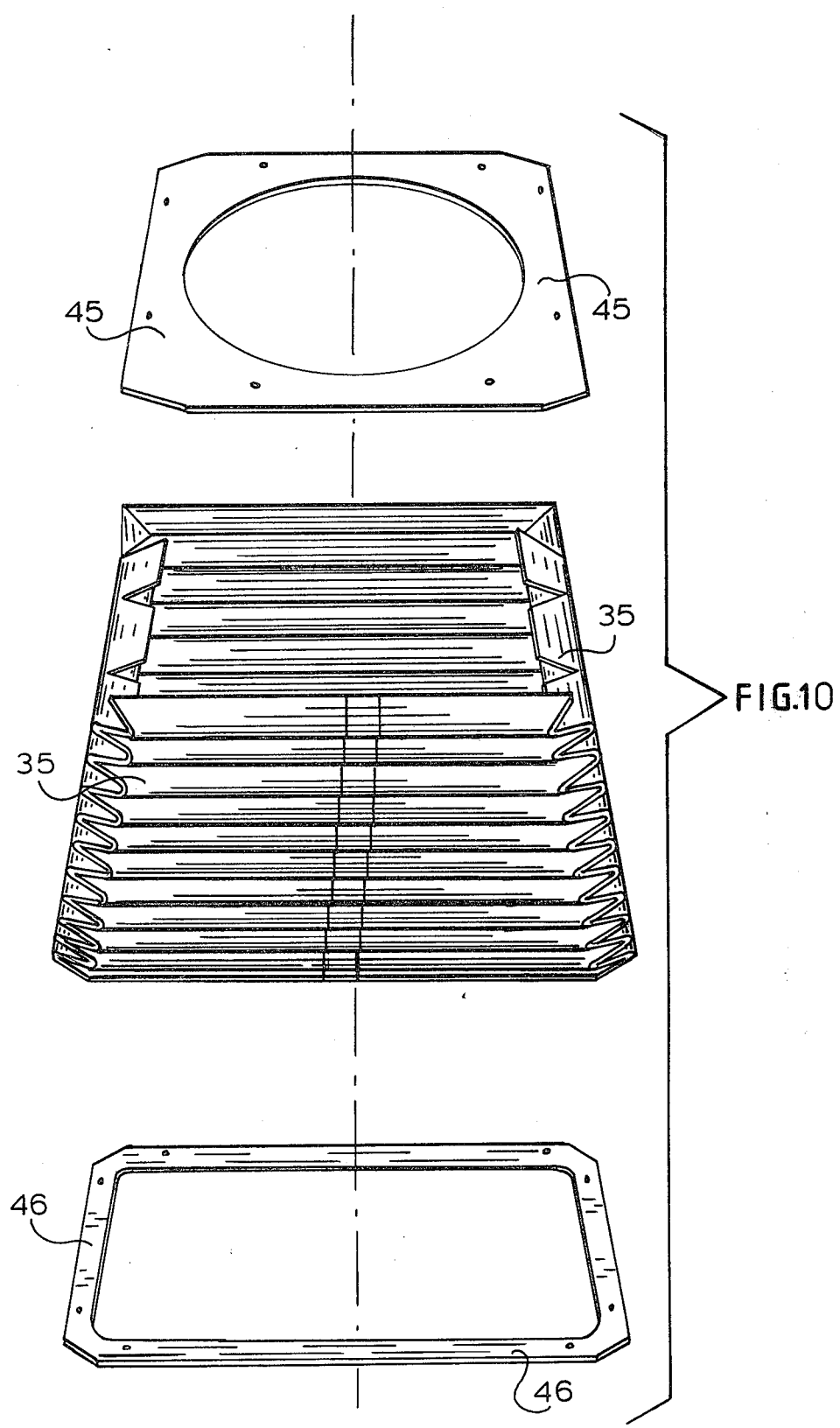

METHOD OF MAKING BELLOWS

FIELD OF THE INVENTION

The present invention relates to a method for making bellows and to a bellows produced thereby. More particularly, it relates to production methods for camera and enlarger bellows or hoods.

BACKGROUND OF THE INVENTION

The need for a protected light path, especially in the field of photography, exists even today in the electronic age. This has been previously accomplished with the traditional three-layer, laminated bellows or hoods (see, e.g., U.S. Pat. No. 3,191,513), the telescoping bellows and the constructions. Each of these construction types have had their advantages and limitations.

In particular, the conventional three-layered laminated bellows constructions which typically consisted of a stiffening paper skeleton or grid sandwiched between two plies to flexible sheet material used to be made with cotton-based fabrics. However, due to their tendency to deteriorate, these cotton-based fabrics have been replaced with nylon which, together with calendered coatings of crude rubber and urethane, have extended product lifetimes beyond fifteen years and $6 \times 10^5$ operating cycles (i.e., extension and contraction of the bellows or hood). Despite this fact, the units are still assembled and glued by hand, placed in a rotary press and manually folded. Delamination and sloppy seams continue to be quality problems for this construction.

The other aforementioned types of bellows constructions also have significant disadvantages. The telescoping bellows, for example, have poor extension to compression ratios, are subject to temperature expansion and jamming, and require costly molds. The vacuum-formed constructions have low operational lifetimes and require costly molds as well.

It is therefore an object of the present invention to provide a novel method for producing bellows and, in particular, camera and enlarger bellows and hoods, which is relatively simple and yet highly effective.

It is a further object of the present invention to produce such a novel method which is fast and efficient and which reduces the number of manual operations.

It is another object of the present invention to provide such a method having the foregoing attributes and characteristics which produces a bellows construction which is reliable, durable and relatively inexpensive.

SUMMARY OF THE INVENTION

Certain of the foregoing and related objects are readily attained in a method for making an axially extendable and contractable bellows of the type which includes a plurality of sides defining a hollow body having a generally polygonal cross-section and an open front and rear end. In bellows of this type, each side has a multiplicity of pleats forming successive ridges and valleys, with each ridge and valley being formed by relatively rigid planar surfaces separated by a relatively flexible joint. As an initial step, in accordance with the invention, a single web of synthetic resin sheet material is moved past at least one die having die edges arranged in a predetermined pattern for producing a separable bellows blank having fold lines formed therein for forming the aforesaid multiplicity of pleats. Then, the bellows blank is die-formed by effecting contact between the die and a portion of the web. Subsequently, the blank is separated from the web and is then folded so that one longitudinal edge thereof overlaps its other longitudinal edge so as to produce a seam, which is then bonded. Finally, the hollow body is compressed along the longitudinal axis thereof and along the fold lines so as to produce the ridges and valleys of each of the sides.

Most advantageously, the method additionally includes the step of heating the die by high frequency heating. In addition, the separating, folding and bonding steps are preferably carried out by placing the blank on a form so that the longitudinal edges thereof overlap and form a seam, and heating the seam by a resistance-heated seaming device to produce a welded seam.

In a preferred embodiment of the invention, the die is disposed for reciprocal movement toward and away from a planar support on which the web is disposed and the die forming step is thus effected by moving the die towards the planar support surface so that the portion of the web is pressed therebetween. Most desirably, the die forming step may include die-cutting so as to produce a separable bellows blank and die scoring or creasing for impressing fold lines on the blank.

In another advantageous embodiment, at least two of the aforementioned dies are provided, at least one of which is mounted for reciprocal movement toward and away from, and relative to, the other die. In this case the die forming step is effected by pressing the portion of the blank between the two dies so that the fold lines are formed on opposite sides of the bellows blank.

In yet another embodiment of the invention, the die forming step includes die scoring with a double-edged scoring die so as to form fold lines defined by a pair of parallel score lines impressed in the blank. Most desirably, the method may also include the step of inserting a rigid hollow frame into each end of the front and rear open ends of the bellows body and securing the marginal edges of the body and the frames together.

Certain of the foregoing and related objects are also attained in an axially extendable and contractable bellows of the aforementioned type which is made from a single sheet of synthetic resin material having die-formed fold lines impressed therein. Most desirably, the synthetic resin material is polyvinyl resin or nylon.

BRIEF DESCRIPTION OF THE DRAWINGS

In the drawings, wherein similar reference characters denote similar elements throughout the several views:

FIG. 3 is a perspective view of the high frequency welding die and die holder employed in the apparatus of FIG. 1;

FIG. 4 is a schematic representation of the basic operative components of the heat sealing apparatus shown in FIG. 2;

FIG. 7 is a side view representation of a high frequency welding die illustrating four fold line-forming die edges disposed between two outer tear seal forming die cutting edges;

FIG. 8 is a side view representation of a high frequency welding matched die set for forming alternating fold lines on both sides of the bellows blank;

FIG. 9 is a side view representation of three alternate dies, the upper die being a scoring die, the middle die being a dual knife scoring die and the lower die being a creasing die having two outer die cutting edges; and FIG. 10 is an exploded perspective view of a compressed and pleated bellows blank with an upper and lower supporting frame.

DETAILED DESCRIPTION OF THE ILLUSTRATED AND PREFERRED EMBODIMENTS

Figure 1:
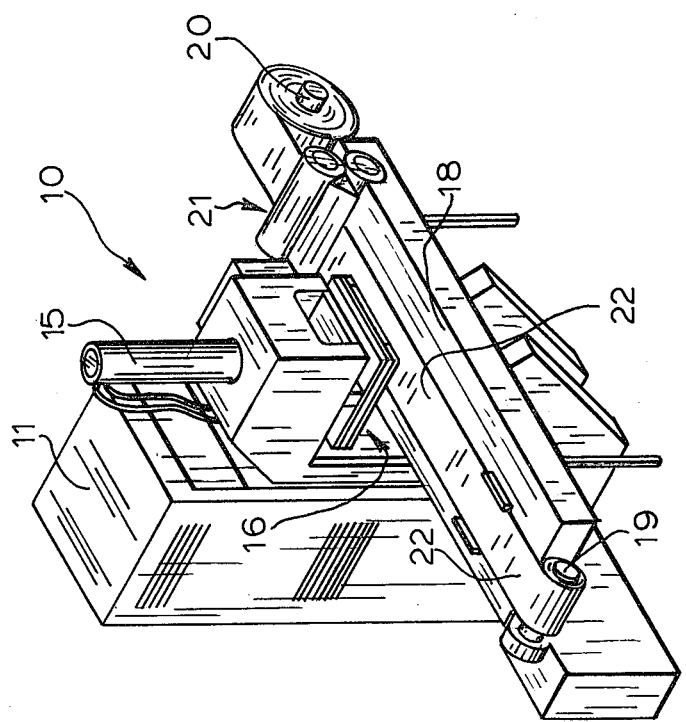
FIG. 1 is a perspective view of a high frequency heat sealing apparatus used in association with the novel method embodying the present invention for forming a bellows blank.

Turning now in detail to the appended drawings and in particular, FIG. 1 thereof, therein illustrated is a high frequency heat sealing apparatus used in performing the novel method embodying the present invention. The apparatus is of essentially conventional construction. A suitable unit is that manufactured by the Sealomatic Division of Solidyne Corporation located at 56 Spence St., Bay Shore, N.Y. (Model No. 1500-FS50).

This conventional unit 10 includes a main housing 11 which houses solid state power supply and control unit 12 (see FIG. 5), a high frequency generator or rf oscillator 13, and a frequency tuning assembly 14. It also includes a pneumatic cylinder 15 for effecting the work stroke of the die press assembly 16 towards the press base plate 17 mounted flush in an elongated conveyor platform or table 18; base plate 17 being provided with a protective Mylar film 30.

Associated with platform 18 are a take-off roller 19 mounted adjacent its front end and a windup roller 20 mounted adjacent its rear end. The rollers 19 and 20 are used in cooperation with an automatic indexer 21 for intermittently advancing a web 22 of a dielectric plastic material between the die press assembly 16 and base plate 17; the web being unwound from a supply roll mounted on take-off roller 19 and being ultimately wound on windup roller 20. A suitable indexer is that supplied by the High Frequency Technology Co. Inc. of 431 Brook Ave., Deer Park, N.Y. (Model Name—Mowi/T Automatic Indexer, which is included with their Series FS heat sealing machine).

Figure 5:
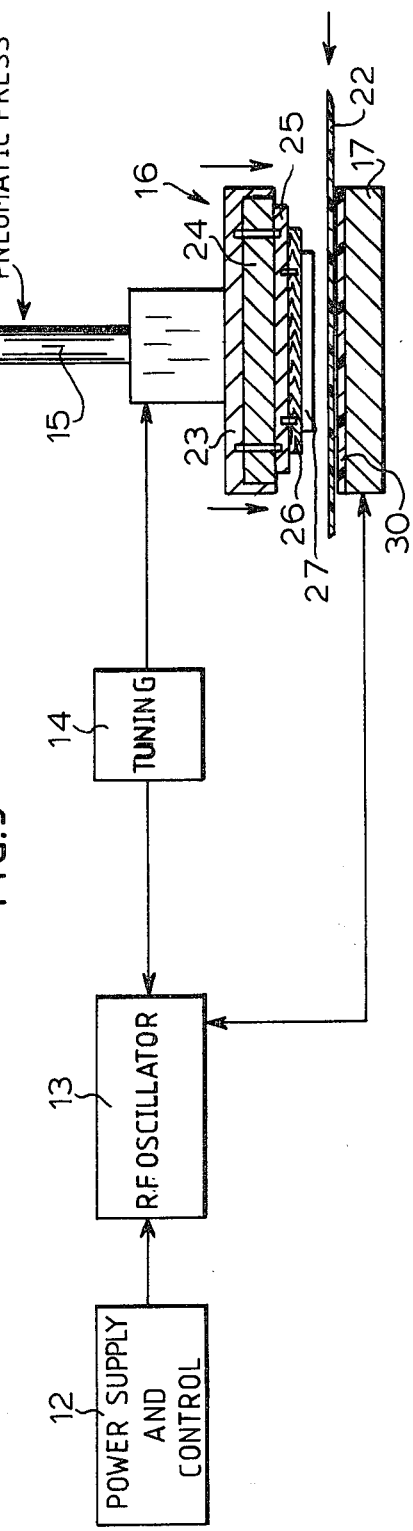
FIG. 5 is a schematic representation of the basic operative components of the high frequency welding apparatus shown in FIG. 1.

As seen more clearly in FIG. 5, the die press assembly 16 includes a metallic press base plate cover 23 which supports a metallic press base plate 24. Press base plate 24, in turn, supports a metallic die base plate 25 to which is secured a wooden die support plate 26. Mounted on die support plate 26 is the high frequency die 27.

As shown in FIG. 3, die 27 comprises a bellows blank forming pattern of steel rules or blades 28 which are arranged to produce fold lines on plastic web 22 in a predetermined pattern. These blades are bounded by a peripherally extending die cutting rule 29 which is intended to produce a tear seal or line defining the outer contour of the bellows blank formed thereby. As shown in FIG. 7, the fold-forming blades 28 have flattened edges which are slightly recessed relative to the sharp beveled edges of cutting rule 29.

The die shown in FIG. 3 is designed to produce a four-sided pleated bellows as shown in FIG. 10. To accomodate this goal there are four longitudinally extending corner fold forming blades 28 having a generally zig-zag profile which define the four corners of the bellows. The remaining transversely extending fold forming blades will define the fold lines between the pleats of each side. Of course it should be realized that this is only one example and the pattern may be modified to produce a variety of different shapes and sizes of bellows.

Turning now to the operation of the high frequency heat sealing apparatus 10, with a portion of the web of dielectric plastic material in position between the die press 16 and the press base plate 17, the upper die press assembly 16 would be initially lowered by pneumatic cylinder 15 to strike web 22. The high frequency oscillator 13 would then be activated to heat die 27 so as to impress the desired fold line pattern into the web. Almost concurrently therewith die cutting rule 29 would form a peripherally-extending tear seal in web 22 so as to define the outline of the thus formed bellows blank. The oscillator would then be turned off, die 27 would be raised by the pneumatic cylinder 15 and the web would be advanced by indexer 12 to position a new portion of the web beneath the upper die press assembly 16. The process would then be repeated so as to provide a continuous supply of bellows blanks.

Figure 2:
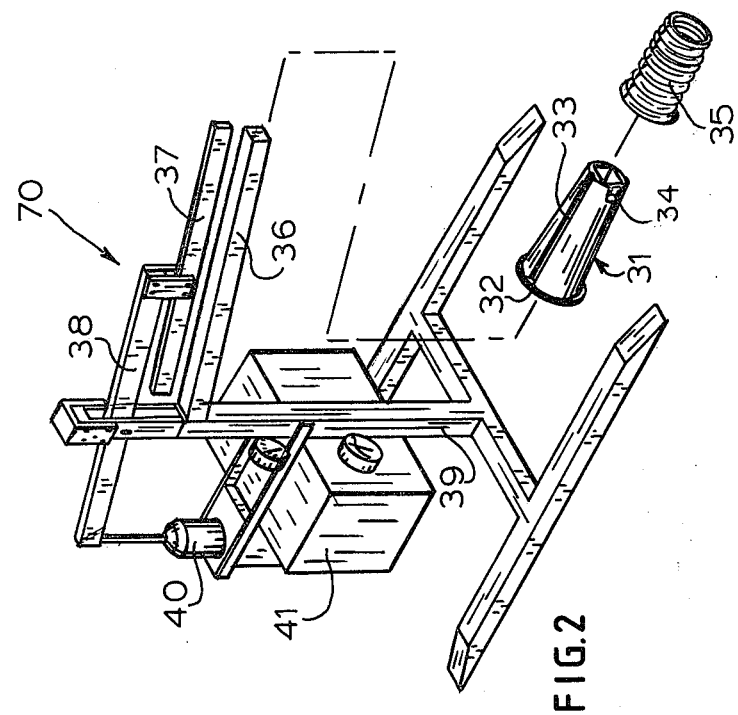
FIG. 2 is a perspective view of a scissor action pneumatically powered heat sealing apparatus used for forming a heat-welded seam.
Figure 6:
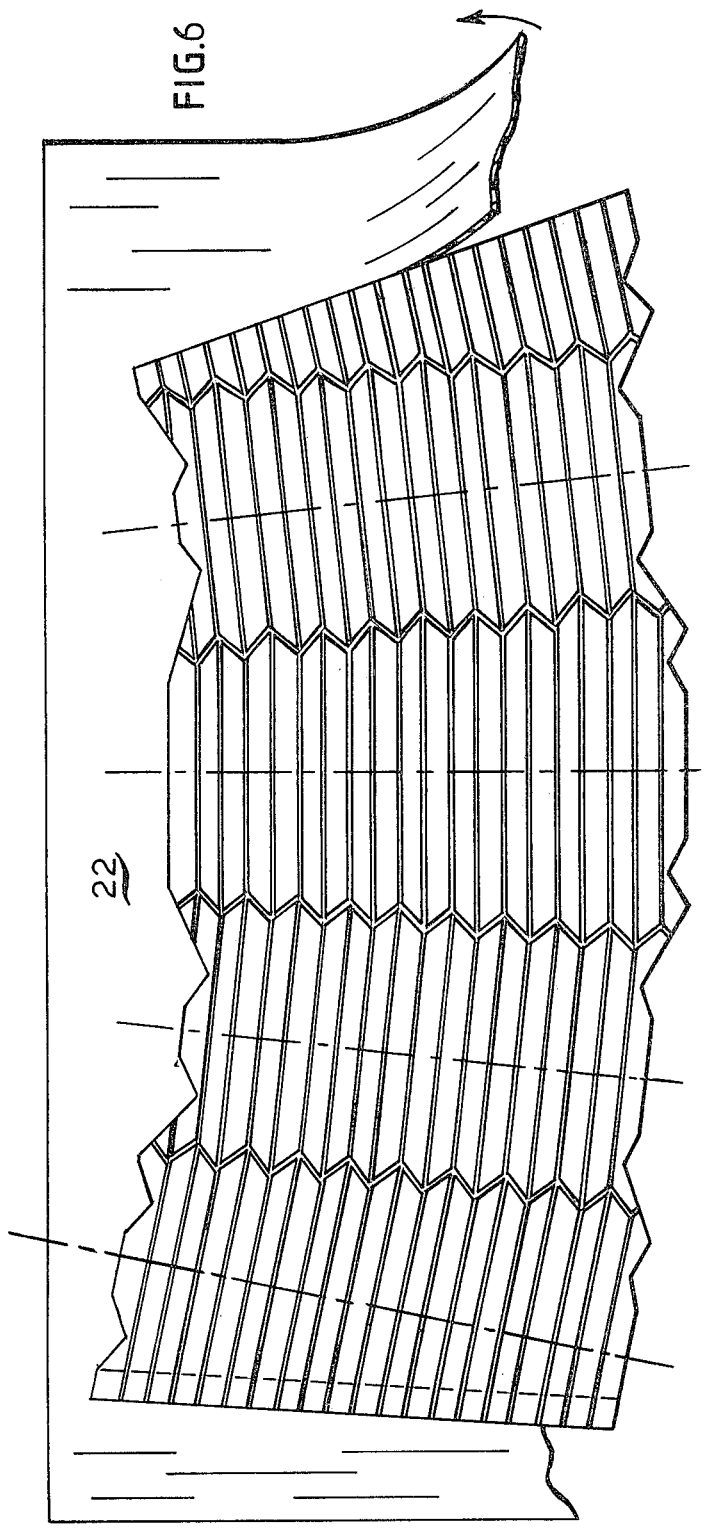
FIG. 6 is a perspective view of a web of sheet material after being die cut and creased by the apparatus of FIG. 1, additionally showing a bellows blank being separated from the remaining scrap sheet material.

Following formations of the bellows blanks, they are then torn from the roll as shown in FIG. 6. Then, they are placed on a removable form 31 of a conventional scissor-type pneumatically-powered heat sealing machine 70 such as that sold by Vertrod Corporation of 2037 Utica Ave., Brooklyn, N.Y. (Model No. 14P/CAN as illustrated in their catalog no. 77) as shown in FIG. 2.

The bellows blank is folded on form 31 to form a hollow body 35 with one of its longitudinal edges overlapping its other longitudinal edge to form a seam. This is assisted by the provision of peripheral lip 32 on the rear end of form 31 which serves as an aligning abutment for one end of body 35 and a longitudinally extending lip 33 which is used to align the longitudinal edges of the body 35 relative to one another; both of these lips may be modified in terms of position and alignment to accomodate differently configured bellows. Form 31 is positioned on a lower jaw or mandrel 36 of sealing machine 70 such that the overlapping seam is positioned directly beneath a resistance-heated, pneumatically cantilevered upper jaw or die 37. Typically, masking tape is used to hold the body in the proper position on form 31.

Upper jaw 37 is secured to one end of a pivot arm 38 pivotably mounted on center post 39. The opposite end of pivot arm 38 is connected to a pneumatic cylinder 40 for effecting pivotable movement of lever arm 38 and, in turn, movement of the upper jaw 37 between an upper, non-operative and lower, engaged and operative position relative to lower jaw 36. The controls for the heat sealing unit are provided in housing 41 and typically a foot pedal (not shown) would be employed to activate and deactivate the unit.

As shown in the schematic of FIG. 4, the upper jaw is essentially a resistance-heated die used to heat seal the seam on the bellows body 35 supported on form 31 which serves as a heat seal base plate. The resistance heated die is heated by means of an electrical impulse (supplied from a single phase AC power supply) which brings the plastic material to its welding temperature which is monitored by a temperature control unit 42 in housing 41.

In operation, the hollow body 35 would be positioned on seam form 31 and the upper jaw 37 would then be lowered into operative engagement with the seam. A thermal impulse would be generated to seal the seam and then deactivated. After a short dwell period, the upper jaw 37 would be pivoted upwardly to its nonoperative position and the body 35 would then be removed from form 31; form 31 being provided with a thumb grip 34 to facilitate removal.

Thereafter, body 35 would be folded by hand or machine. Body 35 is compressed in an axial direction along the fold lines so as to form a multiplicity of pleats in each of the sides defined by a multiplicity of slats of flat planar surfaces which are relatively rigid relative to the separating and parallel fold lines which serve as flexible joints. Subsequently, as shown in FIG. 10, an upper generally rectangular frame 45 and a lower generally rectangular frame 46, each of which has a central aperture would be inserted in and secured to the open top and bottom end of body 35 to produce a thus finished bellows (as used herein it should be noted that the term "bellows" also encompasses camera and enlarger "hoods").

When employing the rf heating sealing apparatus, if is essential that a dielectric plastic or synthetic resin material, preferably thermosetting, be employed so that it is unaffected during generation of the rf field between the upper and lower die base plates. Preferably, the plastic is of a conventional "monolayer" construction as distinguished from the "three layer" construction with a reinforcing skeleton as previously discussed. Polyvinyl plastics have been found suitable. However, this "monolayer" sheet material may have a multi-ply laminated construction. For instance, it might be provided with a relatively stiff dielectirc vinyl upper ply in which the fold line would be formed, an intermediate nylon ply and a lower rubber ply for flexibility, strength and opacity.

FIG. 8 of the drawings illustrates an alternate embodiment for the rf dies. In this case, a matched pair of rf dies 50 and 51 are provided, each of which has alternating fold forming dies 52 which cooperate with opposing supporting dies 53 which serve essentially as a base plate. As a result of this construction, the fold lines formed on the bellows blank will alternate from side to side.

FIG. 9 of the drawings illustrates three alternate dies which could possibly be used to form the bellows blank on a conventional mechanical press such as the Thomson C & C Cutting and Creasing Presses sold by Ever Ready Machinists, Inc. of 137 West 19th St., New York, N.Y. The upper wood die holder 54 supports a plurality of beveled scoring dies 55 which would form the fold lines by scoring. The middle wood die holder 56 supported a plurality of dual knife scoring dies 57 which are separated by metal shims 58 and which form a scored parallel track in the plastic web which serves as a double fold line. Finally, the lower die holder 59 carries two outer cutting rules 60 and a plurality of rounded creasing rules 61, the former of which form a tear seal and the latter of which form crease lines on the plastic web which serves as the fold lines. These dies could be thermally heated. Polyethylene would serve as a suitable plastic sheet material for this case.

As mentioned previously, any number of differently shaped and dimensional bellows may be made in accordance with this novel process. In conjunction therewith, there is a mathematical theory of bellows design pertaining to die construction of both normal and French fold bellows enabling the designer to specify:

(1) corner angles dependent on fold size and length;
(2) step increments in the size of folds on the sides of bellows summing along axes to the difference in dimensions of the front and rear of the bellows; and
(3) modifying said increments to maintain the lowest stress angle with a change in fold width.

While only several embodiments of the present invention have been shown and described, it will be obvious that many modifications and changes may be made thereinunto, without departing from the spirit and scope of the invention.

What is claimed is:

1. In a method for making an axially extendable and contractable camera and enlarger bellows of the type including a plurality of sides defining a hollow body having a generally polygonal cross-section and an open front and rear end, each side of which has a multiplicity of pleats forming successive ridges and valleys with each ridge and valley being formed by relatively rigid planar surfaces separated by a relatively flexible joint, the improvement comprising:

moving a single web of a dielectric sheet material past at least one die having die edges arranged in a predetermined pattern for producing a separable bellows blank having parallel fold lines formed therein for forming said multiplicity of pleats;

die forming said bellows blank by heating said die with rf heating and effecting contact between said die and a portion of said web;

separating said blank from said web and folding said blank on a form so that one longitudinal edge thereof overlaps another longitudinal edge thereof so as to produce a seam;

bonding said seam by a resistance heated seaming device to produce a welded seam; and manually compressing said hollow body along the longitudinal axis thereof and along said fold lines so as to produce a polygonal bellows body having said ridges and valleys in each of the sides thereof.

2. The method according to claim 1, wherein said die is disposed for reciprocal movement toward and away from a planar support on which said web is disposed and wherein said die forming step is effected by moving said die towards said planar support surface so that said portion of said web is pressed therebetween.

3. The method according to claim 1, wherein said die forming step comprises die-cutting so as to produce a separable bellows blank.

4. The method according to claim 1, wherein said die forming step comprises die creasing for impressing fold lines on said blank.

5. The method according to claim 1, wherein said die forming step comprises die scoring for impressing fold lines on said blank.

6. The method according to claim 1, wherein at least two of said dies are provided, at least one of which is mounted for reciprocal movement toward and away from and relative to the other die and wherein said die forming step is effective by pressing said portion of said blank between said two dies so that said fold lines are formed on opposite sides of said bellows blank.

7. The method according to claim 1, which said die forming step comprises die scoring with a double-edged scoring die so as to form fold lines defined by a pair of parallel score line impressed in said blank.

8. The method according to claim 1, additionally including the step of inserting a rigid hollow frame into each end of said front and rear open ends of said body and securing the marginal edges of said body and said frames together.

* * * * *